United States Patent
Nakashima et al.

(10) Patent No.: US 11,720,938 B2
(45) Date of Patent: Aug. 8, 2023

(54) INFORMATION PROCESSING APPARATUS, INFORMATION PROCESSING METHOD, NON-TRANSITORY STORAGE MEDIUM AND VEHICLE SYSTEM

(71) Applicant: TOYOTA JIDOSHA KABUSHIKI KAISHA, Toyota (JP)

(72) Inventors: Toyokazu Nakashima, Nagoya (JP); Toshiomi Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/456,899

(22) Filed: Nov. 30, 2021

(65) Prior Publication Data
US 2022/0180412 A1    Jun. 9, 2022

(30) Foreign Application Priority Data
Dec. 3, 2020    (JP) .................................. 2020-200713

(51) Int. Cl.
| | |
|---|---|
| G07B 15/02 | (2011.01) |
| G06Q 30/02 | (2023.01) |
| G06Q 30/0283 | (2023.01) |
| G07C 5/06 | (2006.01) |
| G06Q 50/30 | (2012.01) |
| G07B 15/06 | (2011.01) |

(52) U.S. Cl.
CPC ......... *G06Q 30/0284* (2013.01); *G06Q 50/30* (2013.01); *G07B 15/02* (2013.01); *G07B 15/06* (2013.01); *G07C 5/06* (2013.01)

(58) Field of Classification Search
CPC .... G06Q 30/0284; G06Q 50/30; G07B 15/02; G07B 15/06; G07C 5/06
See application file for complete search history.

(56) References Cited

U.S. PATENT DOCUMENTS

| | | | |
|---|---|---|---|
| 2017/0116790 A1* | 4/2017 | Kusens .................. | G08G 1/142 |
| 2018/0268617 A1* | 9/2018 | Bruce ..................... | G08G 1/146 |

FOREIGN PATENT DOCUMENTS

JP            3225197 U        2/2020

OTHER PUBLICATIONS

Descant, Skip, "San Francisco Rolls Out Dynamic Parking Rate Model", Jan. 3, 2018, https://www.govtech.com/fs/san-francisco-rolls-out-dynamic-parking-rate-model.html (Year: 2018).*

* cited by examiner

*Primary Examiner* — Resha Desai
*Assistant Examiner* — Michelle E Carey
(74) *Attorney, Agent, or Firm* — Oblon, McClelland, Maier & Neustadt, L.L.P.

(57) ABSTRACT

The present disclosure guides a vehicle to an appropriate parking position in a parking lot. An information processing apparatus according to one aspect of the present disclosure includes a controller, the controller being configured to execute, acquiring vehicle data of a vehicle that is parked in a predetermined parking lot, the vehicle data including information about a parking position in the parking lot, and calculating a parking fee corresponding to the vehicle based on the vehicle data.

2 Claims, 12 Drawing Sheets

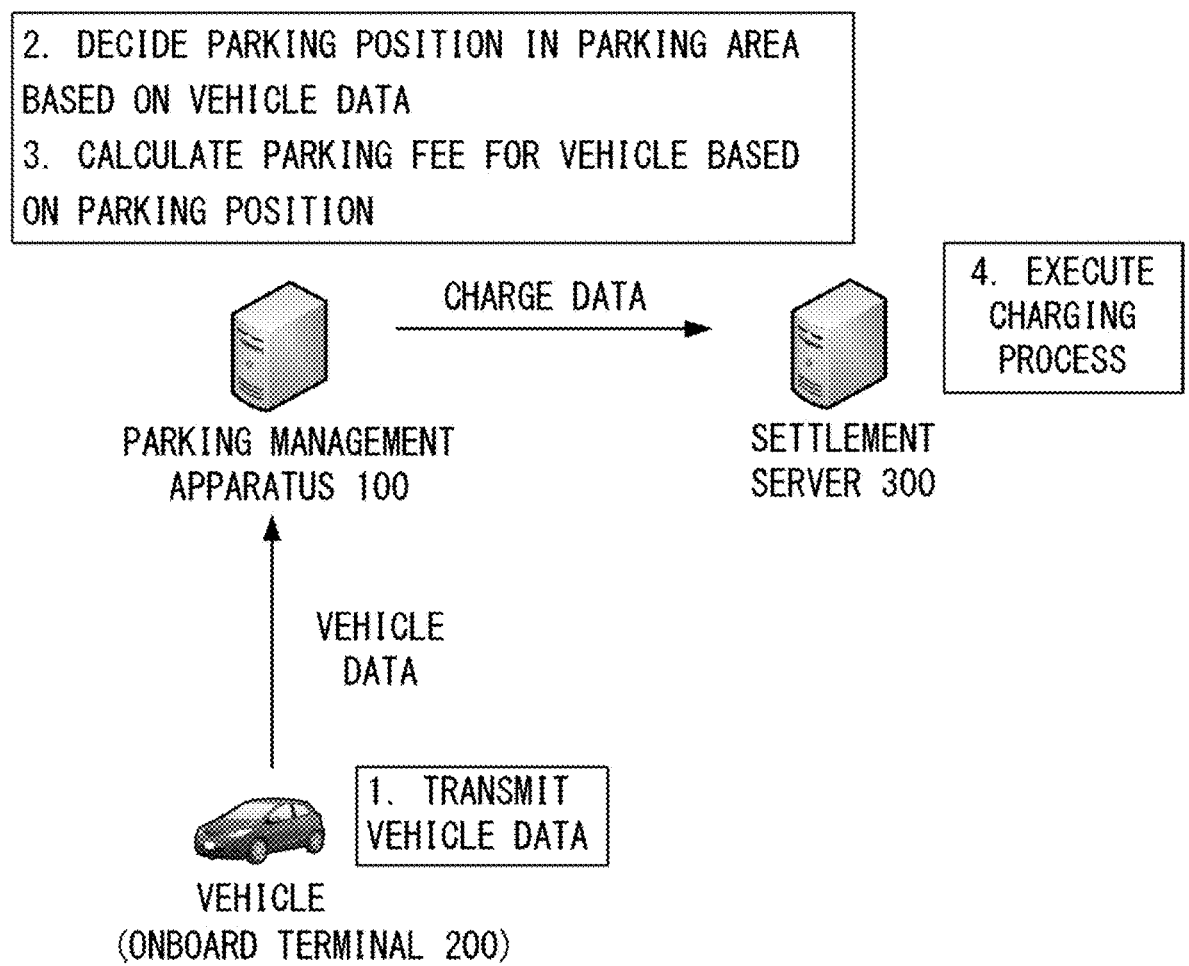

Fig. 4

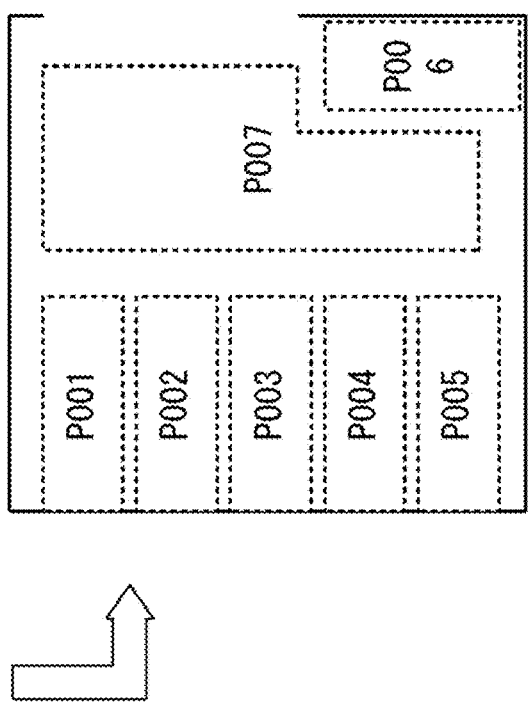

| PARKING AREA ID | POSITION INFORMATION | FEE INFORMATION | CONDITION |
|---|---|---|---|
| P001 | ... | ¥100 PER 30 MINUTES | VEHICLE IS COMPLETELY ACCOMMODATED |
| P002 | ... | ¥100 PER 30 MINUTES | VEHICLE IS COMPLETELY ACCOMMODATED |
| P003 | ... | ¥100 PER 30 MINUTES | VEHICLE IS COMPLETELY ACCOMMODATED |
| P004 | ... | ¥100 PER 30 MINUTES | VEHICLE IS COMPLETELY ACCOMMODATED |
| P005 | ... | ¥100 PER 30 MINUTES | VEHICLE IS COMPLETELY ACCOMMODATED |
| P006 | ... | ¥100 PER 30 MINUTES | VEHICLE IS COMPLETELY ACCOMMODATED |
| P007 | ... | ¥100 PER 10 MINUTES | PART OF VEHICLE IS ACCOMMODATED |

Fig. 5

VEHICLE DATA

| VEHICLE ID | DATE AND TIME INFORMATION | POSITION INFORMATION | DIRECTION INFORMATION | OPERATION STATE | VEHICLE SIZE (MM) |
|---|---|---|---|---|---|
| V001 | 12:00:00 | (LATITUDE, LONGITUDE) | (DIRECTION) | BEING OPERATED | 1695x3950 |
| V002 | 12:01:00 | (LATITUDE, LONGITUDE) | (DIRECTION) | BEING OPERATED | 1800x4300 |
| V003 | 12:02:00 | (LATITUDE, LONGITUDE) | (DIRECTION) | BEING STOPPED | 1855x4650 |
| ... | ... | ... | ... | ... | ... |

Fig. 7

```
THIS IS CORRECT PARKING POSITION
PARKING FEE OCCURS IF YOU PARK HERE

[8:00-20:00]      [20:00-8:00]
MAXIMUM FEE    ¥600              ¥300
BASIC FEE      ¥100 PER          ¥100 PER
               20 MINUTES        60 MINUTES
```

Fig. 10A

PARKING POSITION IS NOT APPROPRIATE
INCREASED FEE OCCURS IF YOU PARK HERE

|  | 8:00-20:00 | 20:00-8:00 |
|---|---|---|
| MAXIMUM FEE | NONE | NONE |
| BASIC FEE | ¥200 PER 20 MINUTES (+¥100 PER 10 MINUTES) | ¥200 PER 60 MINUTES (+¥100 PER 60 MINUTES) |

Fig. 10B

INCREASED FEE OCCURS IF YOU PARK HERE
YOU CANNOT PARK HERE

INFORMATION PROCESSING APPARATUS, INFORMATION PROCESSING METHOD, NON-TRANSITORY STORAGE MEDIUM AND VEHICLE SYSTEM

CROSS-REFERENCE TO THE RELATED APPLICATION

This application claims priority to Japanese Patent Application No. 2020-200713, filed on Dec. 3, 2020, which is hereby incorporated by reference in its entirety.

BACKGROUND

Technical Field

The present disclosure relates to a technique for managing parking of a vehicle.

Description of the Related Art

There are parking systems not using fixed equipment such as lock plates and a fee adjustment machine. In connection therewith, Japanese Utility Model Laid-Open No. 3225197 discloses a system in which a driver of a vehicle notifies a management apparatus that the vehicle has entered or exited a parking lot, via a mobile terminal, and the management apparatus calculates a parking fee based on received information.

[Patent document 1] Japanese Utility Model Laid-Open No. 3225197.

SUMMARY

According to the system described in Japanese Utility Model Laid-Open No. 3225197, it is possible to perform operation of an hourly rental parking lot using a space that is not maintained as a parking lot. However, it is not possible to manage a method for parking a vehicle in the parking lot by the system.

The present disclosure has been made in view of the above problem, and one or more aspects of the present disclosure are directed to guide a vehicle to an appropriate parking position in a parking lot.

An information processing apparatus according to a first aspect of the present disclosure may include a controller including at least one processor, the controller being configured to execute: acquiring vehicle data of a vehicle that is parked in a predetermined parking lot, the vehicle data including information about a parking position in the parking lot; and calculating a parking fee corresponding to the vehicle based on the vehicle data.

Further, an information processing method according to a second aspect of the present disclosure may include: acquiring vehicle data of a vehicle that is parked in a predetermined parking lot, the vehicle data including information about a parking position in the parking lot; and calculating a parking fee corresponding to the vehicle based on the vehicle data.

Further, a vehicle system according to a third aspect of the present disclosure may be a vehicle system including a first apparatus mounted on a vehicle and a second apparatus configured to manage the vehicle, wherein the first apparatus includes a first controller including at least one processor configured to transmit vehicle data including information about a parking position in a predetermined parking lot, to the second apparatus; and the second apparatus includes a second controller including at least one processor configured to execute: acquiring the vehicle data from the first apparatus; and calculating a parking fee corresponding to the vehicle based on the vehicle data.

Further, another aspect of the present disclosure may be a computer-readable storage medium that non-transitorily stores a program for causing a computer to execute the information processing method described above.

According to the present disclosure, it is possible to guide a vehicle to an appropriate parking position in a parking lot.

BRIEF DESCRIPTION OF THE DRAWINGS

FIG. 1 is a diagram explaining an outline of a parking management system;

FIG. 4 illustrates an example of a fee database stored in a storage;

FIG. 5 illustrates an example of a vehicle database stored in the storage;

FIG. 7 illustrates an example of information presented to a driver of a vehicle;

FIG. 10A and FIG. 10B illustrate examples of information presented to the driver of the vehicle.

DETAILED DESCRIPTION

Figure 2A:
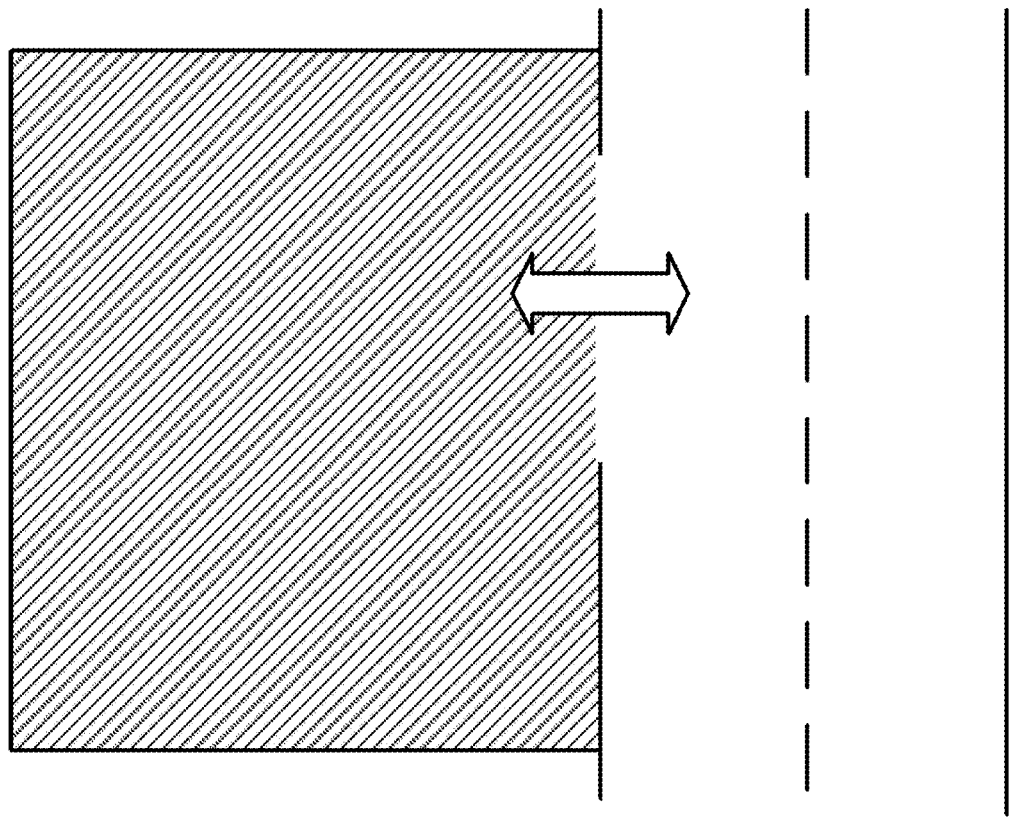
FIG. 2A, FIG. 2B and FIG. 2C are diagrams explaining a parking lot managed by the system.

When a space that is not maintained as a parking lot is operated as a parking lot, there is a possibility that efficient operation becomes impossible because of vehicles being randomly parked. An information processing apparatus according to one embodiment of the present disclosure solves this problem.

The information processing apparatus according to the one embodiment of the present disclosure may be an apparatus that manages an area operated as a parking lot and calculates a parking fee for a vehicle parked in the parking lot. A parking lot targeted by management of the information processing apparatus may be any area for which parking is permitted in advance, and may be a private land.

The information processing apparatus according to the embodiment may include a controller including at least one processor, the controller being configured to execute: acquiring vehicle data of a vehicle that is parked in a predetermined parking lot, the vehicle data including information about a parking position in the parking lot; and calculating a parking fee corresponding to the vehicle based on the vehicle data.

The vehicle data may be data for judging where in a parking lot a vehicle is parked. The parking position may be indicated by coordinates of a latitude and a longitude, and the like or may be indicated by a combination of coordinates and a direction of a vehicle. Furthermore, the parking position may be such that a size of the vehicle is considered.

The controller can judge where in a parking lot (and/or in which direction) a vehicle is parked, based on vehicle data transmitted from the vehicle. Thereby, it becomes possible to impose a penalty on a vehicle that is parked, deviating from a section where parking is assumed and a vehicle that is not parked in a line. Further, it becomes possible to offer a discount to a vehicle that is parked in line as requested.

Further, the vehicle data may include position information about the vehicle.

Further, the vehicle data may further include information about a direction in which the vehicle is oriented.

Further, the vehicle data may further include information about a size of the vehicle.

For example, by using the direction information, it is possible to judge whether or not vehicles are parked in line in the same direction. Further, by using the information about the size of a vehicle, it is possible whether the vehicle is not protruding from a predetermined area.

Further, the controller may judge the parking position of the vehicle in the parking lot, based on the vehicle data, and calculate a parking fee corresponding to the judged parking position.

Thereby, for example, it becomes possible to calculate a regular fee when a vehicle is parked at a predetermined position and, otherwise, calculate a fee with a surcharge.

Further, the controller may judge an area occupied by the vehicle in the parking lot, based on the vehicle data, and calculate a parking fee corresponding to a position of the area.

Thereby, for example, it becomes possible to impose a penalty when a vehicle is parked at a place that interferes with entry/exit of other vehicles.

Further, the information processing apparatus may further include a storage storing data for deciding a calculation criterion for the parking fee corresponding to the parked vehicle; and the controller may calculate the parking fee using the calculation criterion corresponding to the parked vehicle.

The calculation criterion is a fee rule, for example, "a parking fee per unit time" or "a maximum fee per day". Thereby, it can be decided which calculation criterion is applied to calculate a parking fee, depending on where in a parking lot a vehicle is parked.

Further, the controller may further generate guidance data informing a driver of the vehicle about the calculation criterion corresponding to the vehicle.

By presenting applied fee rules to a driver, it is possible to give a motivation to move a vehicle to a more favorable parking position.

Further, the information processing apparatus may further include a storage storing an appropriate parking position in the parking lot, and the controller may calculate the parking fee corresponding to the vehicle based on a degree of deviation of the judged parking position from the appropriate parking position.

Thereby, for example, it becomes possible to charge a higher surcharge as an amount of protrusion from a predetermined section is larger.

Further, the controller may further generate guidance data informing a driver of the vehicle about the appropriate parking position.

Thereby, it becomes possible to guide a vehicle to an appropriate parking position.

Specific embodiments of the present disclosure will be explained below based on drawings. A hardware configuration, a module configuration, a functional configuration and the like described in each embodiment are not intended to limit the disclosed technical scope only to the configurations unless otherwise stated.

First Embodiment

An outline of a parking management system according to a first embodiment will be described with reference to FIG. 1. The parking management system according to the present embodiment is configured, including a parking management apparatus 100 that manages predetermined parking lots, onboard terminals 200 mounted on vehicles, and a settlement server 300 that performs settlement of a parking fee.

The onboard terminals 200 are computers mounted on a plurality of vehicles under the management, respectively. Each onboard terminal 200 acquires vehicle data and periodically transmits the vehicle data to the parking management apparatus 100. The vehicle data is data for judging "whether or not the vehicle is in a parked state in a parking lot under the management of the system" and "a parking position in the parking lot". In the present embodiment, the vehicle data includes position information, direction information and data indicating an on/off state of an ignition power source (which will be described later).

The parking management apparatus 100 is an apparatus that detects that a vehicle has been parked in a parking lot under the management of the system and calculates a parking fee for the parking. In the parking management system according to the present embodiment, a plurality of vehicles can be freely parked in an area specified as a parking lot in advance. The parking lot may be what is operated by a company or may be a private land provided by an individual. Further, the parking management apparatus 100 may manage a plurality of parking lots.

The parking management apparatus 100 judges that parking of a vehicle has started/ended in a predetermined parking lot, based on vehicle data transmitted from an onboard terminal 200. Furthermore, the parking management apparatus 100 performs calculation of a parking fee for the vehicle, based on a parking position of the vehicle in the parking lot. When the parking fee is calculated, charge data is generated and transmitted to the settlement server 300. Thereby, a driver of the vehicle can pay for the parking fee without performing a special operation or procedure.

The settlement server 300 is an apparatus that performs a parking fee settlement process based on charge data. The settlement server 300 may be, for example, an apparatus for charging to a credit card or may be an apparatus for managing electronic money, points and the like.

Here, a method for deciding a parking fee based on a parking position in a parking lot will be described.

FIG. 2A is a bird's-eye view of a parking lot. The hatched area indicates a parking lot managed by the system. This parking lot faces a road, and it is possible to enter or exit the parking lot through a predetermined entrance. This parking lot may be an area that is not maintained as a parking lot, and a fee adjustment machine, frame lines indicating parking segments or the like does not exist.

The parking management apparatus 100 judges that a vehicle has been parked in the parking lot under the management, based on data transmitted from the vehicle, and autonomously performs calculation of a parking fee.

Figure 2B:
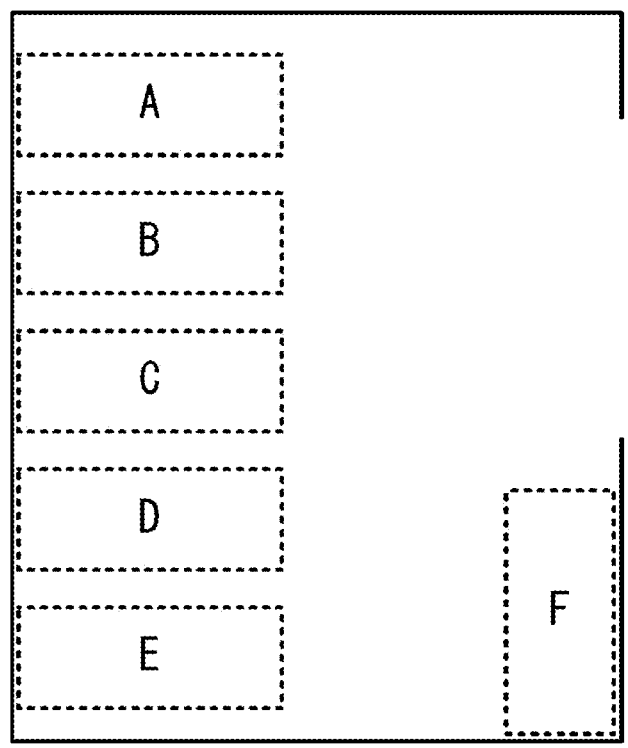
Figure 2C:
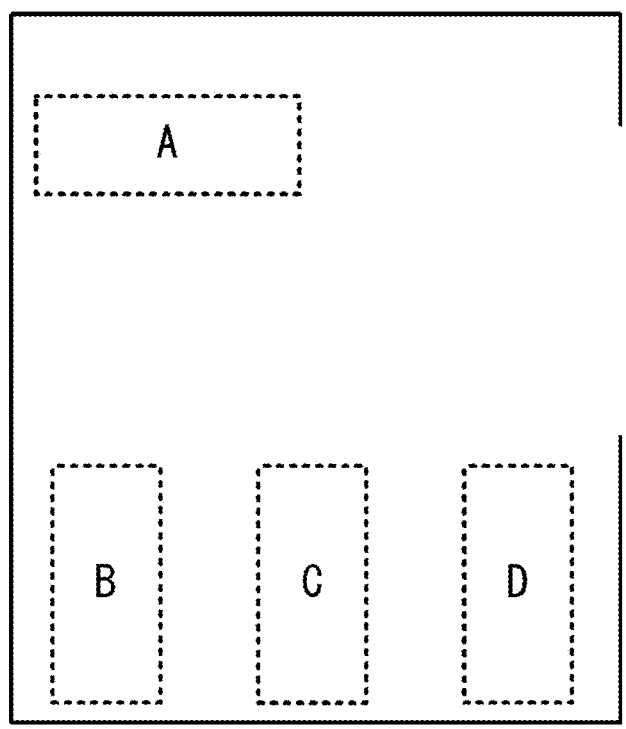

In the case of causing vehicles to enter such a parking lot, the parking lot can accommodate up to six vehicles A to F as illustrated in FIG. 2B. When there are not frame lines indicating parking sections, however, users park their vehicles at positions where it is easy to park. Therefore, for example, there may be a case where the vehicles are parked as illustrated in FIG. 2C. In such a case, the number of vehicles that can be accommodated at the same time decreases, which causes decrease in profit of the parking lot.

Even when a guidance about how to park vehicles is posted at the site, users do not necessarily follow the guidance.

Therefore, in the parking management system of the first embodiment, the parking management apparatus 100 defines a plurality of parking areas for each parking lot, and charges a regular parking fee when a vehicle is accommodated in a regular parking area. In other words, when a vehicle is parked, being deviated from a regular parking area, a certain penalty such as a surcharge is imposed. Thereby, it is possible to cause a vehicle to be accommodated as expected by a parking lot operator.

Figure 3:
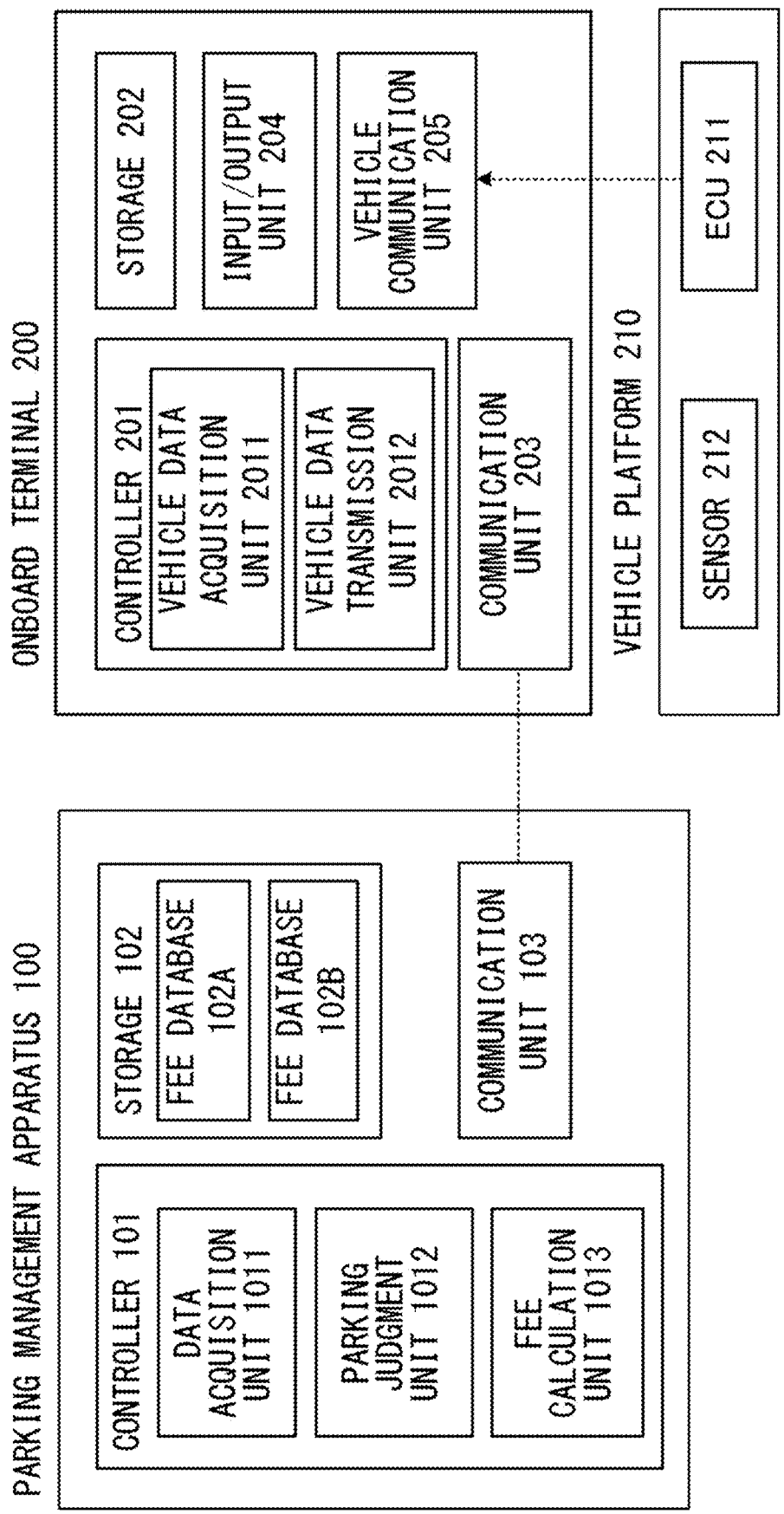
FIG. 3 is a diagram illustrating components of the parking management system in more detail.

FIG. 3 is a diagram illustrating components of the parking management system according to the present embodiment in more detail.

A vehicle platform 210 is a platform including a computer that controls vehicles. The vehicle platform 210 includes, for example, one or more computers that control the vehicles, such as an engine ECU and a body ECU (an ECU 211), and one or more sensors 212 that sense traveling environments of the vehicles. In the present embodiment, a sensor that acquires position information about the vehicles and a sensor that detects directions in which the vehicles are oriented are exemplified as the sensors 212. Sensing results are acquired by the ECU 211 and provided for the onboard terminals 200.

The onboard terminals 200 are computers mounted on the vehicles. Each onboard terminal 200 is configured, including a controller 201, a storage 202, a communication unit 203, an input/output unit 204 and a vehicle communication unit 205. The onboard terminal 200 can acquire values outputted by the sensors 212 by performing communication with the vehicle platform 210.

The controller 201 is an arithmetic device that is responsible for control performed by the onboard terminal 200. The controller 201 can be realized by an arithmetic processing device such as a CPU (central processing unit).

The controller 201 is configured, including two function modules of a vehicle data acquisition unit 2011 and a vehicle data transmission unit 2012. These function modules may be realized by executing a program stored in a storage 202 described later by the CPU.

The vehicle data acquisition unit 2011 acquires vehicle data. In the present embodiment, the vehicle data includes the following four kinds of data:
(1) Data indicating a geographical position of the vehicle (position information)
(2) Data indicating a direction in which the vehicle is oriented (direction information)
(3) Data indicating an operation state of the vehicle
(4) Data indicating a size of the vehicle The data indicating an operation state of the vehicle is typically data indicating whether the vehicle is in a state of being able to travel at once or not, and is, in the present embodiment, data indicating whether the ignition power source of the vehicle is turned on or not.

In this example, the vehicle is a gasoline vehicle. In the case of an electric vehicle, data indicating whether the power source (especially the power source for traveling) of the vehicle is turned on or not may be used as the data indicating an operation state of the vehicle. These pieces of data can be acquired from the ECU 211 via the vehicle communication unit 205 to be described later. Further, the position information and the direction information can be acquired from the sensors 212 via the vehicle communication unit 205.

Further, though the state of the ignition power source is exemplified as the operation state data in the present embodiment, the data may be data indicating an operation state of an engine (for example, an engine speed or the like).

The data indicating a size of the vehicle is, for example, data indicating an overall length and overall width of the vehicle and is fixed values for each vehicle.

The vehicle data transmission unit 2012 periodically transmits vehicle data acquired by the vehicle data acquisition unit 2011 to the parking management apparatus 100.

The storage 202 is configured, including a main memory and an auxiliary storage device. The main memory is a memory where a program executed by the controller 201 and data used by the control program are developed. The auxiliary storage device is a device in which the program executed by the controller 201 and the data used by the control program are stored. In the auxiliary storage device, what is obtained by packaging the program executed by the controller 201 as an application may be stored. An operating system for executing such an application may be stored. By the program stored in the auxiliary storage device being loaded to the main memory and executed by the controller 201, a process described hereinafter is performed.

The main memory may include a RAM (random access memory) and a ROM (read-only memory). The auxiliary storage device may include an EPROM (erasable programmable ROM) and an HDD (hard disk drive). Furthermore, the auxiliary storage device may include a removable medium, that is, a removable recording medium.

The communication unit 203 is a wireless communication interface for connecting the onboard terminal 200 to a network. The communication unit 203 is configured, being capable of communicating with the parking management apparatus 100, for example, via a mobile communication service such as a wireless LAN, 3G, LTE or 5G.

The input/output unit 204 is a unit that accepts an input operation performed by the user and presents information to the user. In the present embodiment, the input/output unit 204 is configured with one touch panel. That is, the input/output unit 204 is configured with a liquid crystal display and control therefor, and a touch panel and control therefor.

The vehicle communication unit 205 is an interface unit that performs communication with the vehicle platform 210. The vehicle communication unit 205 is configured to be capable of communicating with the ECU 211 that the vehicle platform 210 includes, via an onboard network.

Next, the parking management apparatus 100 will be described.

The parking management apparatus 100 performs a process for receiving vehicle data from the onboard terminals 200 and judges that parking of a vehicle has started in a parking lot under the management and that the parking of the vehicle has ended, based on the received vehicle data. Furthermore, the parking management apparatus 100 judges a position where the vehicle is parked in the parking lot using the vehicle data and calculates a parking fee according to the judged position. Further, the parking management apparatus 100 executes a process for generating data for charging the parking fee (charge data).

The parking management apparatus 100 can be configured with a computer. That is, the parking management apparatus 100 can be configured as a computer that includes a processor such as a CPU and a GPU, a main memory such as a RAM and a ROM, an auxiliary storage device such as an EPROM, a hard disk drive and a removable medium. In the auxiliary storage device, an operating system (OS), various kinds of programs, various kinds of tables and the like are stored. By loading a program stored therein to a work area of the main memory, executing the program, and each of components and the like being controlled through the execution of the program, each of functions that meet predetermined purposes as described later can be realized. A part or all of the functions may be realized by a hardware circuit like an ASIC and an FPGA.

A controller 101 is an arithmetic device that is responsible for control performed by the parking management apparatus 100. The controller 101 can be realized by an arithmetic processing device such as a CPU.

The controller 101 is configured, including three function modules of a data acquisition unit 1011, a parking judgment unit 1012 and a fee calculation unit 1013. Each function module may be realized by executing a stored program by the CPU.

The data acquisition unit 1011 executes a process for acquiring vehicle data from the onboard terminals 200 mounted on the vehicles under the management of the system and causing the acquired vehicle data to be stored into a storage 102 to be described later.

The parking judgment unit 1012 judges that a vehicle is parked in any of the plurality of parking lots under the management of the system, based on the stored vehicle data.

Further, the parking judgment unit 1012 identifies an area where the vehicle is parked among a plurality of parking areas defined for each parking lot. For example, in the case of the example of FIG. 2B, the parking judgment unit 1012 judges whether the target vehicle is located in any of the areas indicated by A to F or not.

Furthermore, the parking judgment unit 1012 judges that the vehicle is in a parked state based on the vehicle data. For example, when a state of the ignition power source being turned off continues for a predetermined time or more, it can be judged that the corresponding vehicle is in the parked state.

A result of the judgment made by the parking judgment unit 1012 is transmitted to the fee calculation unit 1013.

The fee calculation unit 1013 calculates a parking fee corresponding to the vehicle based on the result of the judgment made by the parking judgment unit 1012. Specifically, the fee calculation unit 1013 (1) acquires fee information associated with the parking area where the target vehicle has been parked, (2) decides a period in which the target vehicle has been parked (parking period) and (3) calculates a parking fee based on the fee information and the parking period. A specific method will be described later.

Further, the fee calculation unit 1013 generates charge data for charging the parking fee and transmits the charge data to the settlement server 300.

The storage 102 is configured including a main memory and an auxiliary storage device. The main memory is a memory where a program executed by the controller 101 and data used by the control program are developed. The auxiliary storage device is a device in which the program executed by the controller 101 and the data used by the control program are stored.

Furthermore, the storage 102 stores a fee database 102A and a vehicle database 102B.

The fee database 102A is a database that stores data for calculating a parking fee. In the fee database 102A, a plurality of parking areas and pieces of fee information corresponding to the parking areas (parking fee calculation criteria) is associated and stored.

FIG. 4 is a diagram illustrating an example of the data stored in the fee database 102A.

In a parking area ID field, an identifier that uniquely identifies a parking area is stored. In a position information field, data indicating a geographical position (a range) of the parking area is stored. In a fee information field, fee information associated with the parking area is stored. The fee information may include, for example, a parking fee per unit time, a condition for each time zone, a maximum fee and the like. The fee information may be referred to as a parking fee calculation criterion.

In a condition field, a condition for judging that a vehicle is parked in a corresponding parking area is stored. For example, in the case of this example, when a vehicle is completely accommodated in a parking area with an identifier of P001, it is judged that the vehicle is parked in the parking area, and a fee of "¥100 for 30 minutes" is applied. Further, when a part of a vehicle is included in a parking area with an identifier of P007, it is judged that the vehicle is parked in the parking area, and a fee of "¥100 for 10 minutes" is applied.

These pieces of data are managed and updated by a manager of the parking lot.

The vehicle database 102B is a database that stores vehicle data acquired from the onboard terminals 200. In the vehicle database 102B, a plurality of pieces of vehicle data acquired from the plurality of onboard terminals 200 is stored.

FIG. 5 is a diagram illustrating an example of the data stored in the vehicle database 102B.

In a vehicle ID field, an identifier that uniquely identifies a vehicle is stored. In a date and time field, a date and time when vehicle data was generated is stored. In a position information field, position information about the vehicle is stored. The position information may be indicated, for example, by a latitude and a longitude. In a direction information field, direction information about the vehicle is stored.

In an operation state field, data indicating whether the vehicle is in an operation state or not is stored. For example, when an engine is operated or when the ignition power source is on, the operation state is "being operated". When the engine is stopped or when the ignition power source is off, the operation state is "being stopped"

In a vehicle size filed, data indicating a size of the vehicle is stored.

The vehicle database 102B is periodically updated based on vehicle data transmitted from the onboard terminals 200.

The fee database 102A and the vehicle database 102B are constructed by a program of a database management system (DBMS) executed by the processor managing data stored in the main memory. The fee database 102A and the vehicle database 102B are, for example, relational databases.

A communication unit 103 is a communication interface for connecting the parking management apparatus 100 to the network. The communication unit 103 is configured, for example, including a network interface board and a wireless communication module for wireless communication.

The configuration illustrated in FIG. 3 is a mere example, and all or a part of the illustrated functions may be executed with dedicatedly designed circuits. Further, storage and execution of the program may be performed by a combination of a main memory and an auxiliary storage device other than the illustrated combination.

Figure 6:
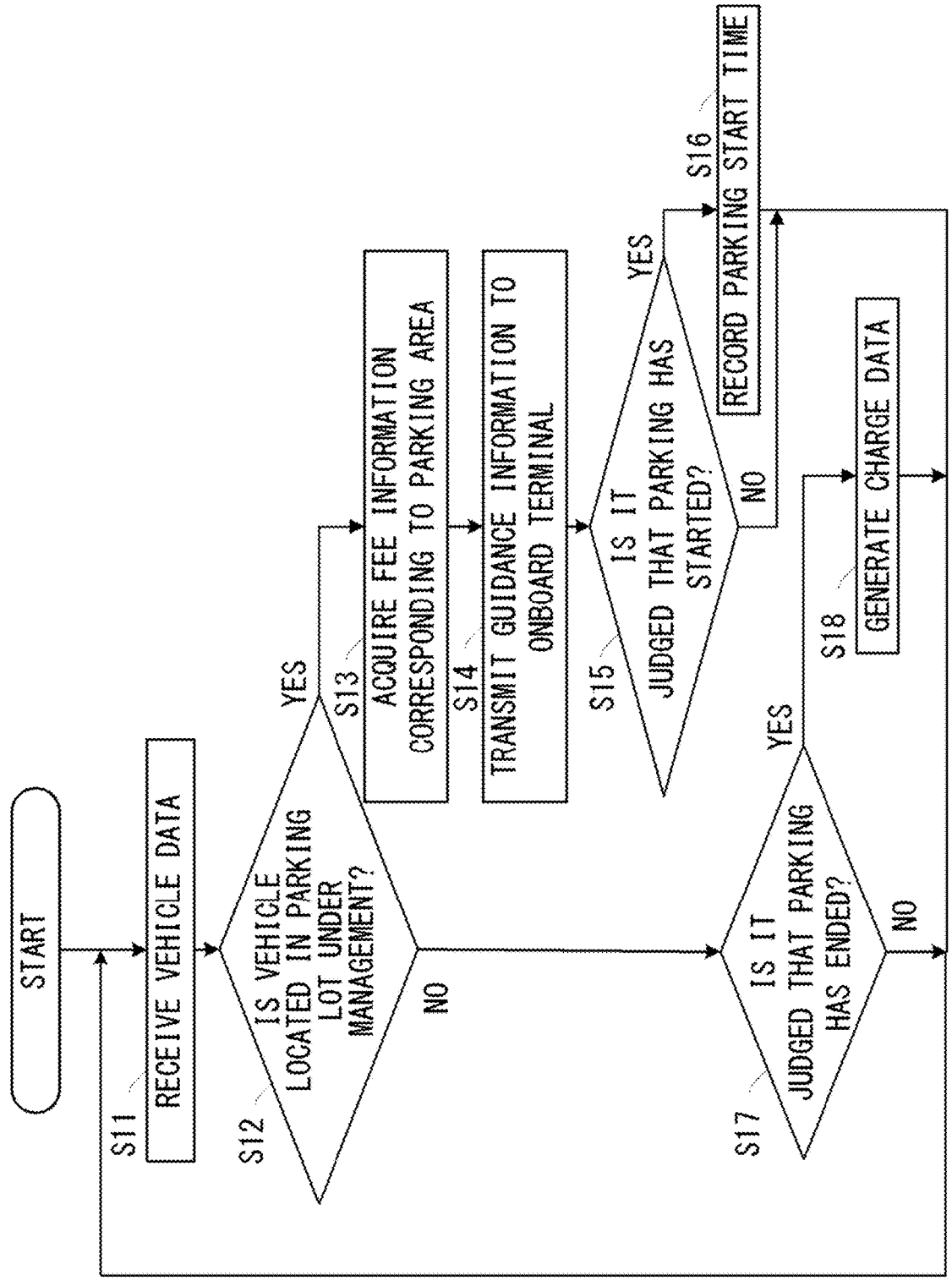
FIG. 6 is a flowchart of a process performed by a controller in a first embodiment.

FIG. 6 is a flowchart illustrating a process performed by the parking management apparatus 100. The flowchart illustrated in FIG. 6 is periodically executed for each of the plurality of vehicles during operation of the system.

At step S11, the data acquisition unit 1011 receives vehicle data transmitted from an onboard terminal 200. The received vehicle data is stored into the vehicle database 102B.

Next, at step S12, the parking judgment unit 1012 judges whether the target vehicle is located in a parking lot under the management of the system, based on the acquired vehicle data. When a positive judgment is made at this step, the process transitions to step S13. When a negative judgment is made, the process transitions to step S17.

There may be a case where a parking lot is indoors, and position information is acquired via a satellite. In such a case, when acquisition of position information is interrupted near the parking lot, it may be judged that "the vehicle has entered the parking lot".

At step S13, an area occupied by the vehicle is identified based on position information, direction information and size information about the vehicle included in the received vehicle data. Further, the identified area is compared with parking areas defined in the fee database 102A to identify a parking area where the vehicle is parked. Furthermore, fee information corresponding to the identified parking area is acquired.

For example, when a certain vehicle is completely accommodated in a parking area with an identifier of P001, fee information of "¥100 for 30 minutes" is acquired.

At step S14, guidance information is transmitted to the corresponding onboard terminal 200. The guidance information can be information for notifying of the fee information acquired at step S13. FIG. 7 illustrates an example of the guidance information outputted via the onboard terminal 200 (the input/output unit 204). The guidance information may be outputted as an image or characters or may be outputted by voice or the like.

An image illustrating arrangement of a plurality of parking areas as illustrated in FIG. 2B may be included in the guidance information, and the onboard terminal 200 may output the guidance information. Thereby, a driver of the vehicle can recognize a position where the vehicle is to be accommodated. In this case, the onboard terminal 200 may superpose a graphic illustrating a position of its own vehicle on the image.

At step S15, it is judged whether parking of the target vehicle has started in the parking area or not. At this step, it is judged that parking of the target vehicle has started in the parking area when the following conditions are satisfied:
(1) The position of the vehicle is inside the parking area judged at step S13.
(2) A state in which the operation state of the vehicle is "being stopped" has continued for a predetermined time or more.

The predetermined time can be a grace period until it is judged that parking has started, and it is set, for example, to five minutes.

When it is judged at step S15 that parking has started, parking start time is recorded at step S16.

At step S17, it is judged whether parking of the target vehicle has ended or not. At this step, it is judged that parking of the target vehicle has ended in the parking area when the following conditions are satisfied:
(1) Parking start time has been recorded.
(2) The operation state is "being operated".

When it is judged at step S17 that parking has ended, charge data is generated at step S18.

At step S18, a parking fee for a period from the recorded parking start time until time at which it was judged that parking had ended is obtained. Then, the generated charged data is transmitted to the settlement server 300.

As described above, the parking management apparatus 100 according to the first embodiment decides a parking area corresponding to a vehicle and a parking period, based on vehicle data received from an onboard terminal 200. Further, the parking management apparatus 100 performs calculation of a parking fee using fee information associated with the parking area. According to such a configuration, a parking fee can be changed between a case where a vehicle is parked in a predetermined parking area and other cases. Thereby, it becomes possible to give a motivation for parking a vehicle at a correct parking position, to a driver of a vehicle and maximize the operation profit of a parking lot.

Modification of First Embodiment

In the first embodiment, it is judged at step S15 that parking has started when the state in which the operation state is "being stopped" continues for the predetermined time or more. However, when a target vehicle can be regarded as being temporarily stopped though the engine and the like are stopped, it should not be judged that parking has started. Therefore, it may be judged whether the target vehicle is in a temporarily stopped state or not.

For example, by including data indicating an on/off state of a hazard lamp into vehicle data, and a judgment about a parking state may be made on condition that the hazard lamp is not lit.

Further, by including data indicating whether there is a person in the vehicle or not into the vehicle data, and a judgment about a parking state may be made on condition that there is not a person in the vehicle. As for whether there is a person in the vehicle or not, it can be detected, for example, by a weight sensor or a seatbelt sensor provided for the vehicle. Data other than the data exemplified above may be included into the vehicle data when the data is for judging whether the vehicle is in the temporarily stopped state or not.

Furthermore, position information may be acquired from a mobile terminal that a driver of the vehicle owns so that, when position information corresponding to the onboard terminal 200 and the position information corresponding to the mobile terminal indicate the same place, the judgment about a parking state is not performed.

Even when these conditions are satisfied, there may be a case where a vehicle should be judged to be in a parked state, such as a case where the vehicle has been parked for a long time. In order to respond to such a case, when a temporary parking is judged, the judgment about a parking state may be performed after extending the "predetermined time" described before.

Second Embodiment

In the first embodiment, a regular fee is defined for an appropriate parking area, and a fee with a surcharge is defined for other parking areas. In comparison, a second embodiment is an embodiment in which only an appropriate parking area is defined, and, the more a vehicle is away from the parking area, the more the parking fee is increased.

Figure 8:
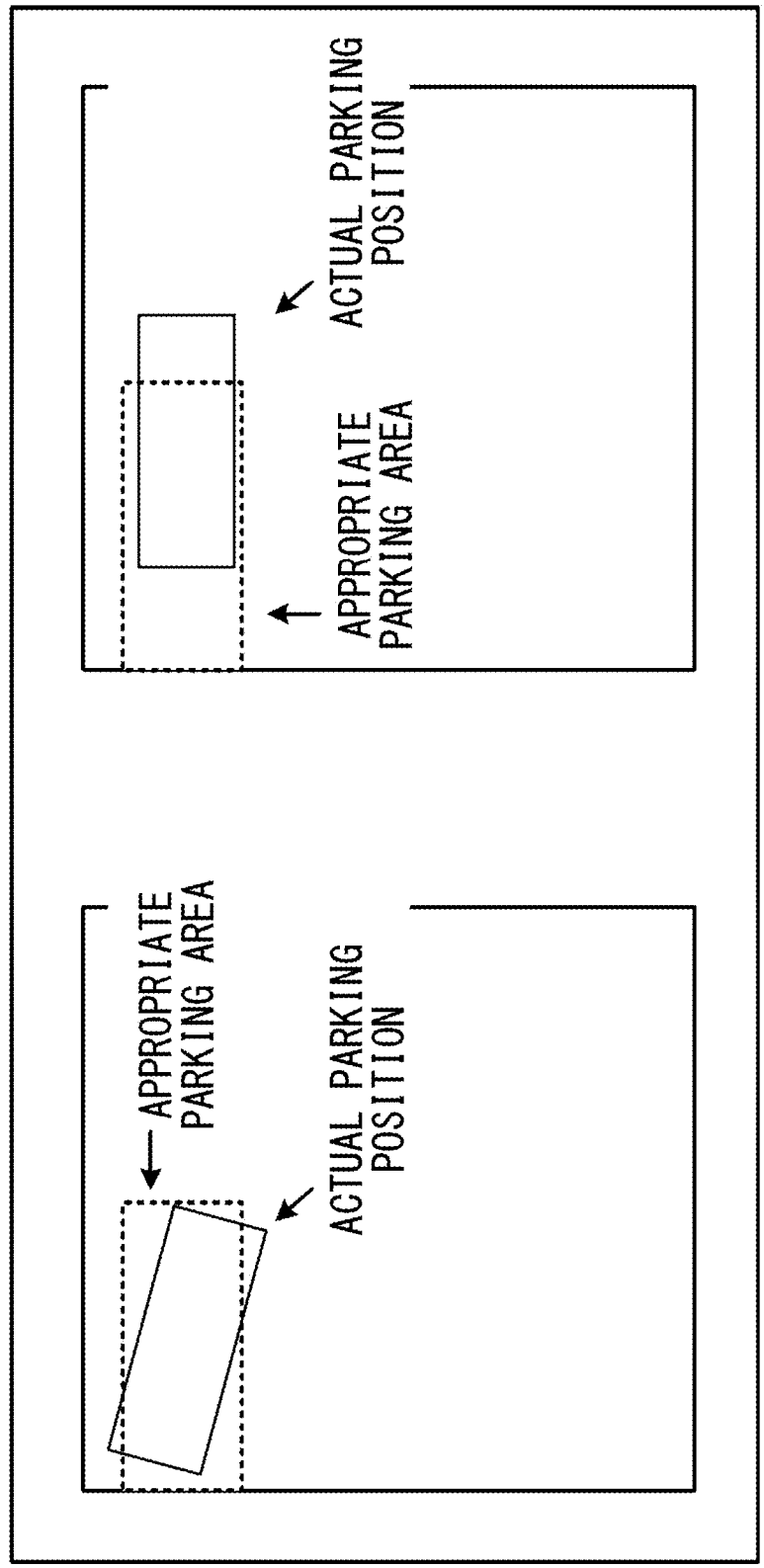
FIG. 8 is a diagram explaining an appropriate parking area in a second embodiment.

FIG. 8 is a diagram illustrating a relationship between an appropriate parking area and a position at which a vehicle is actually parked. As illustrated, when a vehicle is not accommodated in an appropriate parking area, the vehicle can interfere with parking of other vehicles. Therefore, it is desirable to impose a penalty on such a vehicle. In the second embodiment, a degree of deviation of an area occupied by a vehicle from an appropriate parking area is calculated, and a parking fee is increased based on the deviation degree.

Figure 9:
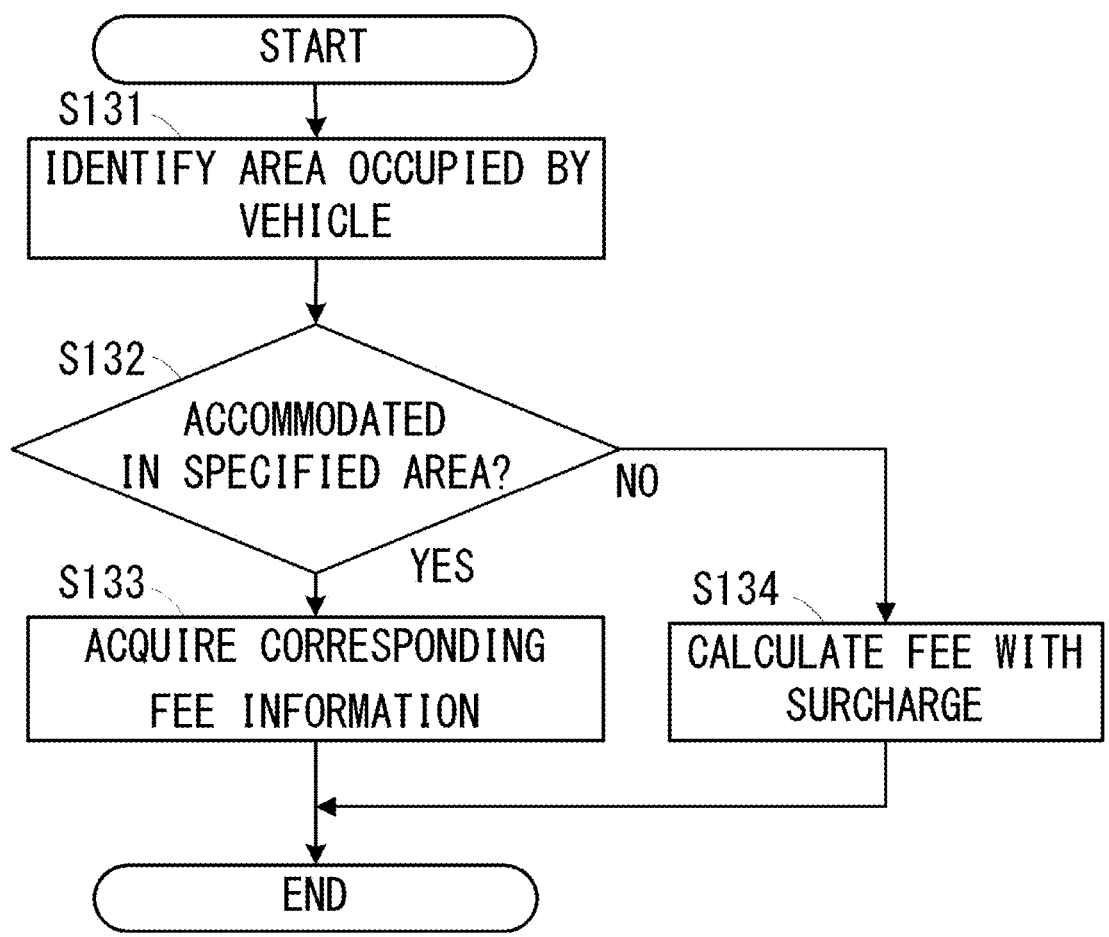
FIG. 9 is a flowchart of a process performed by the controller in the second embodiment.

FIG. 9 is a flowchart of a process executed at step S13 in the second embodiment. The illustrated process is executed by the fee calculation unit 1013.

At step S131, an area occupied by the vehicle is identified based on position information, direction information and size information about the vehicle included in the received vehicle data.

At step S132, the identified area is compared with a parking area defined in the fee database 102A (that is, an appropriate parking area) to judge whether the vehicle is accommodated in the parking area. When a positive judgment is made here, the process transitions to step S133, where corresponding fee information is acquired. On the other hand, when a negative judgment is made at step S132, the process transitions to step S134, where a fee with a surcharge corresponding to a deviation degree is calculated.

The surcharge may be calculated by multiplying an original parking fee by a coefficient or may be calculated using a dedicated table or the like in which surcharges are defined. FIG. 10A illustrates an example of guidance information in a case where a vehicle is protruding from a specified parking area.

The surcharge may be set, for example, to increase as a vehicle is away from a specified parking area more. According to the second embodiment, it is possible to give a motivation for causing a vehicle to be accommodated in a specified parking area, to a driver.

(Modification)

The above embodiments are mere examples, and the present disclosure can be appropriately changed and implemented within a range not departing from its spirit.

For example, the processes and means described in the present disclosure can be freely combined and implemented as far as technical contradiction does not occur.

Further, though an example is given in which the parking management apparatus 100 transmits guidance information to an onboard terminal 200 in the description of the embodiments, the guidance information may be transmitted to another apparatus associated with a vehicle. For example, the guidance information can be transmitted to a mobile terminal or the like that a driver of the vehicle owns.

Further, though a parking fee is increased when a vehicle deviates from a predetermined parking area in the description of the embodiments, parking outside a predetermined parking area itself may be prohibited. In this case, the guidance information as illustrated in FIG. 10B may be transmitted to the onboard terminal 200 without performing calculation of a parking fee.

Figure 11:
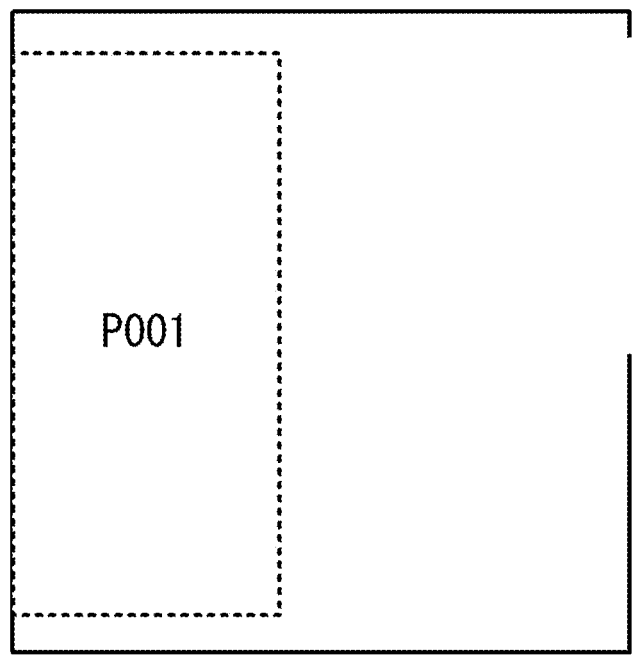
FIG. 11 is a diagram explaining a parking area according to a modification.

Further, though a parking area for one vehicle is defined in the description of the embodiments, a parking area may be, for example, of such a size that a plurality of vehicles can be parked as illustrated in FIG. 11.

Further, in the description of the embodiments, (1) a plurality of parking areas is specified in advance, and (2) it is judged whether a vehicle is accommodated in any of the parking areas or not. However, when a parking fee corresponding to a parking position of a vehicle (or a position of an area occupied by a vehicle) in a parking lot can be calculated, it is not necessarily required to judge "whether the vehicle is accommodated in a specified parking area", and it is also not necessary to specify parking areas in advance.

For example, a degree of appropriateness of a way of parking or a degree of deviation from parking rules determined in advance may be calculated for each vehicle each time based on vehicle data to calculate a parking fee based on a result of the calculation.

For example, when there is a rule that "parking should be performed in a predetermined direction along a wall" in a certain parking lot, it can be judged whether a vehicle is parked according to the rule, based on position information and direction information included in vehicle data. In this case, it may be decided whether a regular parking fee is calculated or a fee with a surcharge is calculated, based on a degree of deviation from the rule.

Further, when there is a rule that "the passage should not be interfered with" in a certain parking lot, it can be judged whether a vehicle interferes with the passage, based on position information and size information about the vehicle included in vehicle data. In this case, a fee with a surcharge may be calculated when the vehicle interferes with the passage.

Thus, a parking rule may be defined by an area in which a vehicle should be accommodated, an area that should not be interfered with, an appropriate position of the vehicle, an appropriate direction of the vehicle and the like.

Further, though the parking management apparatus 100 directly receives vehicle data from the onboard terminals 200 in the description of the embodiments, the vehicle data may be collected via a server or the like. For example, the onboard terminals 200 can transmit vehicle data to a center server via wireless communication, and the center server can transmit the vehicle data to the parking management apparatus 100 via a communication line.

Further, though the parking management apparatus 100 manages a single parking lot in the description of the embodiments, the parking management apparatus 100 may manage a plurality of parking lots. In this case, the fee database 102A is defined for each of the plurality of parking lots so that corresponding data can be used.

Further, a process described as being performed by one apparatus may be shared and executed by a plurality of apparatuses. Or alternatively, processes described as being performed by different apparatuses may be executed by one apparatus. In a computer system, what hardware configuration (server configuration) each function is realized by can be flexibly changed.

The present disclosure can also be realized by supplying a computer program in which the functions described in the above embodiments are implemented to a computer, and one or more processors that the computer includes reading out and executing the program. Such a computer program may be provided to the computer by a non-transitory computer-readable storage medium connectable to a system bus of the computer or may be provided to the computer via a network. The non-transitory computer-readable storage medium includes, for example, a disk of an arbitrary type such as a magnetic disk (a floppy (registered trademark) disk, a hard disk drive (HDD) and the like) and an optical disk (a CD-ROM, a DVD disc, a Blu-ray disc and the like), a read-only memory (ROM), a random-access memory (RAM), an EPROM, an EEPROM, a magnetic card, a flash memory, an optical card, and a medium of an arbitrary type that is appropriate for storing electronic commands.

What is claimed is:

1. A vehicle system comprising:
 an onboard terminal mounted on a vehicle and configured to receive sensor data by communicating with a vehicle platform that controls the vehicle;
 one or more sensors which are included in the vehicle platform and sense traveling environments of the vehicle, the one or more sensors including a first sensor that senses position information about the vehicle and a second sensor that senses direction information in which the vehicle is oriented;

a hardware circuit which is included in the vehicle platform, the hardware circuit controlling the first sensor and the second sensor; and a parking management apparatus configured to manage parking of the vehicle, wherein the parking management apparatus includes a storage configured to store a predetermined parking area in a parking lot, an area that interferes with a passage, and data for deciding calculation criterion for parking fees corresponding to a parking area where the vehicle parks in the parking lot, the onboard terminal comprises a first controller including at least one processor configured to:

receive position information about a parking position in the parking lot and direction information about a direction in which the vehicle is oriented in the parking lot, the position information and the direction information being sensed by the first sensor and the second sensor respectively under control of the hardware circuit; and transmit, to the parking management apparatus, vehicle data of the vehicle including the position information, the direction information, and size information indicating a length and a width of the vehicle, and the parking management apparatus comprises a second controller coupled to the storage, the second controller including at least one processor configured to execute:

receiving, from the onboard terminal, the vehicle data of the vehicle;

identifying a parking area of the vehicle in the parking lot based on the position information, the direction information, and the size information;

calculating a degree of deviation of the identified parking area from the predetermined parking area;

acquiring, from the storage, a calculation criterion for a regular parking fee corresponding to the parking area of the vehicle;

calculating a parking fee corresponding to the vehicle based on the identified parking area and the calculation criterion for the regular parking fee;

determining whether the identified parking area includes the area that interferes with the passage;

acquiring, from the storage, a calculation criterion for a parking fee with a surcharge based on the degree of deviation, in response to the identified parking area not including the area that interferes with the passage;

calculating the parking fee corresponding to the vehicle based on the identified parking area and the calculation criterion for the parking fee with the surcharge based on the degree of deviation;

acquiring, from the storage, a calculation criterion for a parking fee with the surcharge based on the degree of deviation and with a further surcharge for including the area that interferes with the passage, in response to the identified parking area including the area that interferes with the passage;

calculating the parking fee corresponding to the vehicle based on the identified parking area and the calculation criterion for the parking fee with the surcharge based on the degree of deviation and the further surcharge for including the area that interferes with the passage;

generating charge data for charging the calculated parking fee; and transmitting the charge data to a settlement server that settles the calculated parking fee.

2. The vehicle system according to claim 1, wherein the at least one processor of the second controller is configured to generate guidance data informing a driver of the vehicle about the calculation criterion corresponding to the parking area of the vehicle and output the guidance data via the onboard terminal.

* * * * *